Feb. 24, 1931. W. R. TURNBULL 1,793,654
AIR PROPELLER
Filed June 20, 1929 3 Sheets-Sheet 1

INVENTOR
Wallace R. Turnbull
BY
Eyre Scott & Keep
ATTORNEY

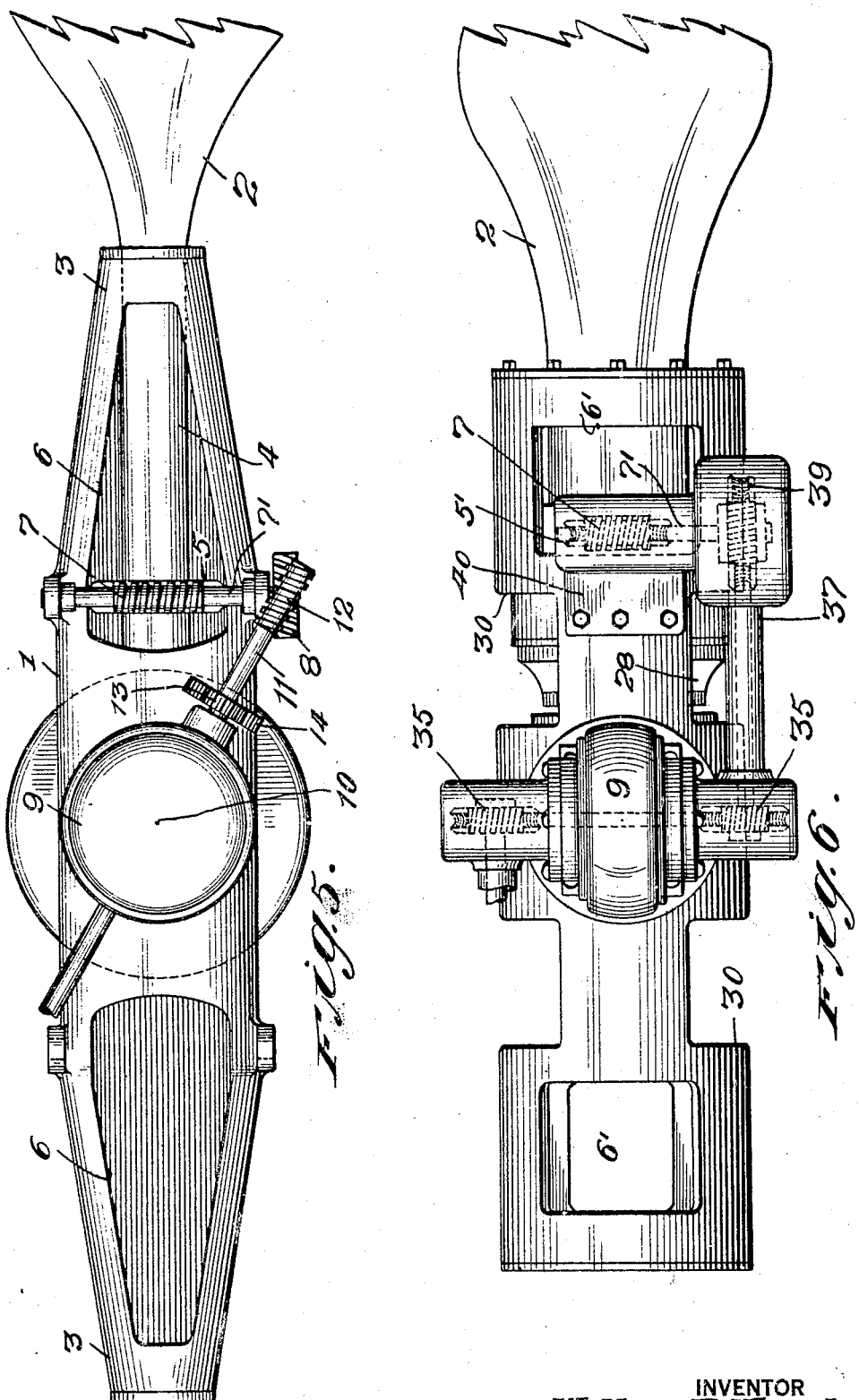

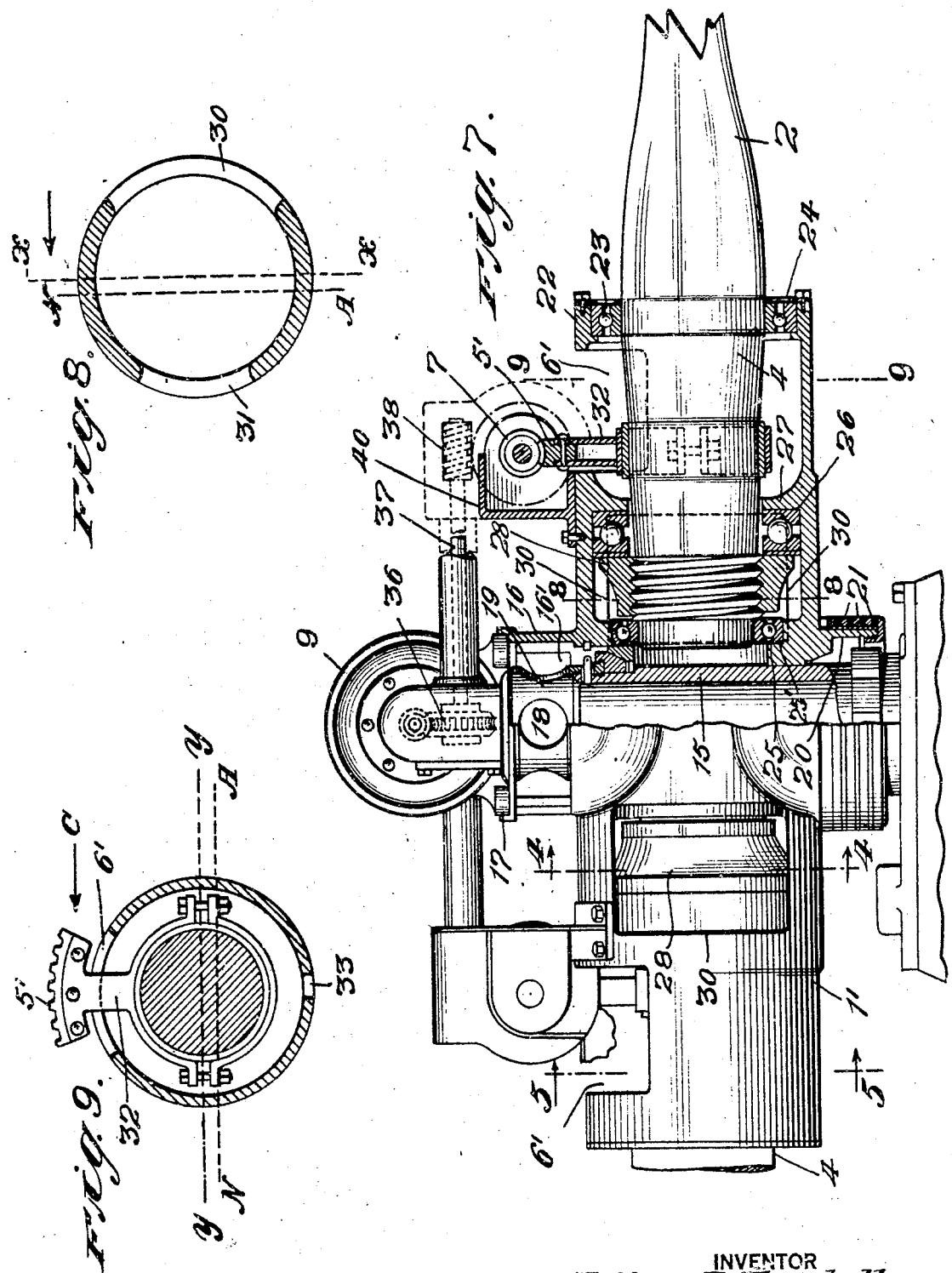

Patented Feb. 24, 1931

1,793,654

UNITED STATES PATENT OFFICE

WALLACE R. TURNBULL, OF GARDEN CITY, NEW YORK

AIR PROPELLER

Application filed June 20, 1929. Serial No. 372,288.

This invention relates to air propellers for use in airplanes, airships and air propelled vehicles and aircraft generally.

The invention relates generally to that class of air propellers in which hub and blade portions are not integral but may be separated one from the other or adjusted with reference to each other, such, for example, as the so-called detachable blade, adjustable pitch, variable pitch and controllable pitch types of propellers.

One object of the invention is a novel hub structure for this type of propeller resulting in substantial reduction of propeller weight, while maintaining adequate strength and factor of safety. A further object of the invention is a propeller structure facilitating the assembling of the parts. A further object of the invention is a propeller construction facilitating the assembly of the pitch adjusting mechanism and the operation of the pitch adjusting mechanism. A still further object of the invention is a variable pitch propeller characterized by its rigidity in construction and lightness in weight, and by the compactness and reliability of the hub structure and the adjusting mechanism. Certain features of the invention are equally applicable to the split hub and one-piece hub types of propellers, although certain features thereof are of particular advantage when embodied in the one or other type of propeller.

Figure 1:
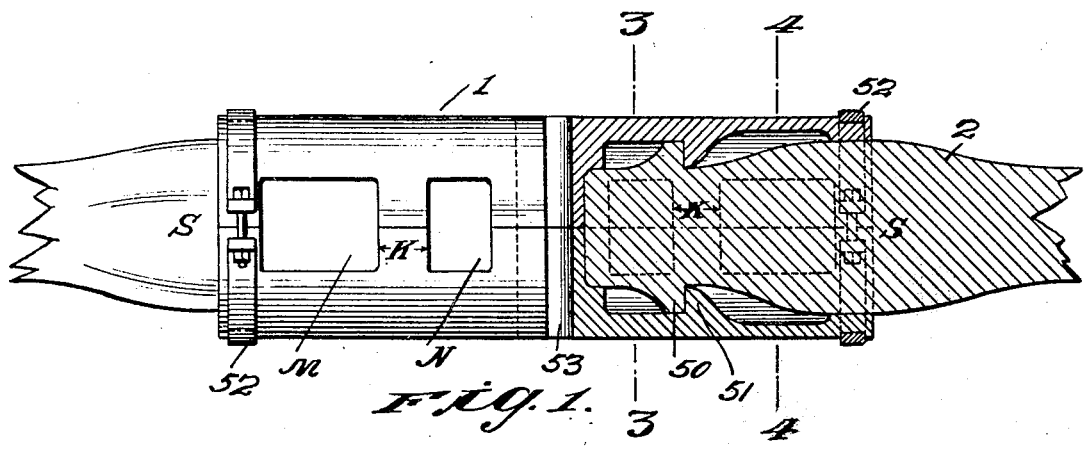
Figure 2:
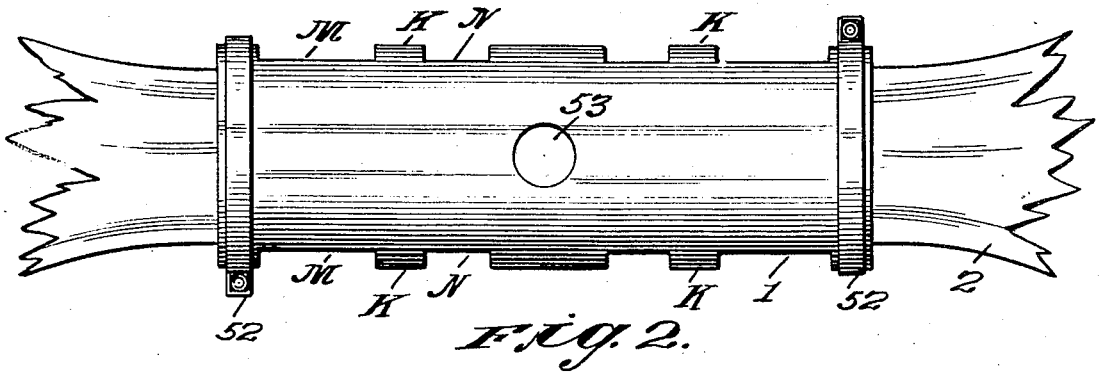
Figure 3:
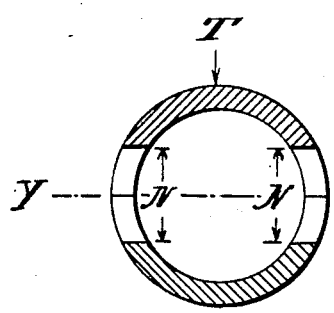
Figure 4:
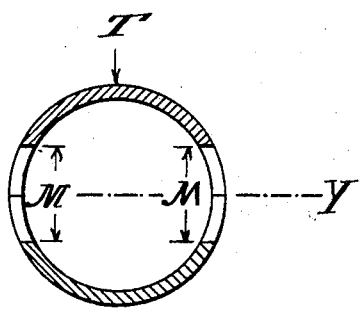

For a better understanding of the invention reference may be had to the accompanying drawings wherein:

Fig. 1 is a side view of a detachable blade propeller embodying certain features of the invention, Fig. 2 is a front view of the same looking in the direction of the axis of rotation of the propeller, Fig. 3 is a sectional view of the hub along the line 3—3 of Fig. 1, Fig. 4 is a sectional view of the hub along the line 4—4 of Fig. 1, Fig. 5 is a view of another form of propeller embodying certain features of the invention, Fig. 6 is a similar view of a modified form of the invention, Fig. 7 is a side view thereof with certain parts in section, Fig. 8 is a sectional view of the hub casing along the line 8—8 of Fig. 7, and Fig. 9 is a sectional view along the line 9—9 of Fig. 7.

Referring to the drawings I have shown in Figs. 1 to 4 a detachable blade propeller having a two-piece hub split along the line S—S wherein certain principles of my invention are embodied. The propeller hub as a whole is designated by the numeral 1 while the blades are designated by the numeral 2, and in the particular embodiment shown the propeller is of the two-blade type while the principles of the invention are applicable to the multi-blade type generally. The propeller blades are indicated of conventional standard form whose shanks are formed with the annular exterior flanges or shoulders 50 which are engaged by the corresponding interior shoulders 51 of the hub 1. Conventional clamping and fastening means are indicated at 52 for rigidly holding the two parts of the hub 1 together in gripping relation with the blades 2. The hub 1 is indicated of the conventional cylindrical shape and having an axis or opening 53 for the reception of a propeller drive shaft. I have formed openings in the propeller hub on diametrically opposite sides thereof and in the plane of rotation of the propeller, a pair of such openings M being provided on either side of the axis of rotation. I have also formed a pair of diametrically disposed openings N inwardly disposed with reference to the openings M. A complete circular section of the hub being retained at section K between the pairs of openings M and N and similarly complete circular hub sections are provided at the clamping means 52 and between the part 52 and the inwardly disposed openings N. The openings M are indicated as being substantially larger than the openings N but substantially of the same depth, the shape however, and relative dimensions of these openings being variable under different conditions.

The arrows T—T (Figs. 3 and 4) indicate the approximate direction of the aerodynamic thrust load, on the blades, and also the direction of the maximum bending moment, due to this thrust when the same is transmitted to the hub, and I have found that certain portions of the hub can be advantageously removed, and considerable weight be thus saved, when the removed portions M and N are arranged approximately as shown in the drawings, since the moment of inertia of such sections is great, in proportion to the area, when the bending stress due to stress load is approximately at right angles to the axis Y—Y (of Figs. 3 and 4).

In cases that I have calculated, the ratio of I/A (I, being the moment of inertia, and A, the area of the section) has been doubled, or more, in comparison with standard uncut or unreduced circular sections of the same internal and external diameters. The amount of weight saved is, of course, in proportion to the length of the cut-out sections that can be economically, and conveniently, employed—and this rests on the general proportioning of the design, as a whole, and the hub-lengths that are most desirable, in practice. It will be noted, for instance, that the length of the cut-out portions is reduced by the retention of the complete circular section, at the part "K", Fig. 1. This is done to give adequate bearing area on the internal shoulder 51 of the hub, and the collar-shoulder 50 on the blade, for a proper shear-area in both hub and blade, to carry the centrifugal load on the blade.

It may also, be sometimes more advantageous, particularly when using one-piece hubs, to make the openings M and/or N on one side wider than the corresponding openings on the other, so that parts for the assembly of the blades in the hub may be introduced through the wider openings, and this also is an advantageous arrangement with reference to the ratio I/A, and in comparison with integral circular sections, but it is usually not quite so advantageous as the arrangement of openings of approximately the same width such as those shown in Fig. 3 and Fig. 4. However, when it is advisable to use the two openings, and one wider than the other, I have found it better to place the wider opening on the same side of the hub as the trailing edge of the propeller-blade, as the bending moment, then due to the centrifugal force of the blades, and other parts, will partly or wholly, offset the stresses caused by the engine torque on the hub.

It may also be more advantageous to vary the widths of the openings, in the case of variable pitch propellers, for the purpose of not only introducing necessary assembly parts, but also to introduce and permanently place, certain links, gears, shafts, or the like, that have to do with the operation of the blade moving mechanism. In this case also it may be necessary to have one opening larger than the diametrically opposite opening and the same conditions will then apply as indicated above.

In the case of variable pitch propellers, cases will occur when the convenience due to making openings at the most advantageous parts of the hub (strength and weight only considered) will over-ride other considerations, and it will be advisable to place the opening in hub wall at a place, such that the I/A ratio of the section is not a maximum. These cases will usually apply to the outer part of the hub, where the saving of weight is not so important, since the walls there are thinner, and even in these cases, by a proper proportioning of the parts, the bending force, due to the centrifugal load, can be offset, partly or wholly, against that due to the aerodynamic thrust, and a certain amount of weight will be saved in proportion to that of a closed section when the length of the opening can be made sufficient, since the maximum bending force occurs at the inner end of the outer part of the hub, and yet the whole outer part of the hub is affected on the question of weight, and for convenience of manufacture the hub walls will be maintained parallel instead of tapered.

Such a case is illustrated in Figs. 5 to 9 where, for the attainment of a compact design, the supporting arm 32 of the main worm wheel 5′ has been let through the opening 6, 6′ while this effects a saving in the weight of the hub-portion, a further but indirect saving is also effected in the weight of the propeller, as a whole, since parts 37, etc. are shortened, and parts such as 32, 5′, 7, 40, etc. may be made lighter, since they are subjected to less centrifugal force than they would be, if carried to the end of the hub.

Referring to Fig. 5 which is a front view of the propeller looking in the direction of the driving axis, I have indicated a propeller including a hub 1, and variable pitch blades 2, the embodiment shown including two such blades one being omitted for convenience in illustration. The hub 1 is formed with socket parts 3 to receive the shanks 4 of the blades 2, each of the shanks 4 being journaled in the hub both at the outer end of the socket 3 and at the inner end thereof, the journal for the latter being omitted for convenience in illustration. Each shank 4 is provided with a gear segment 5 and the hub 1 is provided with openings 6 through which a pitch altering driving connection is effected. A worm drive 7 suitably mounted on the hub 1 at right angles to the shank meshes with this gear segment 5 and this worm is carried by a shaft 7′ which on its projecting end carries the driving gear 8, as for example of the worm type. A driving motor unit 9 is mounted across the axis of rotation 10 of the propeller, the motor 9 being preferably symmetrically arranged about the axis 10 of the propeller and with the motor shaft at right angles to and passing through the axis 10. The two blades 2 are rigidly geared together for simultaneous adjustment in pitch by means of a shaft 11 which is suitably journaled on the hub or electric motor frame structure, this shaft 11 carrying on its ends worms 12 which mesh with the worm pinions 8 on the adjusting cross shafts of the propeller blades. The shaft of motor 9 is geared to the drive shaft 11 through the gears 13 and 14 which are disposed respectively on the motor shaft and the shaft 11. The electric motor 9 is reversible and any suitable connections, such for example as slip rings, may be provided for conducting the current to and from the motor for driving it in either direction desired for varying the pitch of the propeller blades 2. The gear ratio ordinarily is very high as, for example, above 40,000 to 1. A motor unit 9 of comparatively small dimensions and power is sufficient to adjust the angle of the blades 2 and particularly where ball or roller bearings are provided for taking up the thrust due to centrifugal force of the blades as, for example, such as are provided in my application S. N. 209,599 filed July 30, 1927. The provision of a hub structure 1 with the sockets and bearings for the reception of the blade shanks 4 and with the openings 6 for accommodating gearing connections at a point as near as possible to the motor 9 results in a substantial shortening of the gearing shaft and generally in an arrangement characterized by its compactness, its lightness in weight, and its ability to safely withstand the strains to which it is subjected in practice. This construction also renders possible and practicable the use of a one-piece hub 1, the latter being formed of a single hollow casting or forging, and when a one-piece hub is utilized I have devised a special construction thereof and assembly of the bearing units which co-operatively function to minimize the weight, to reduce the friction and to increase the factor of safety as, for example as illustrated more in detail below.

Referring to Figs. 6, 7, 8 and 9 of the drawings which show a modified form of the invention the stub driven axle upon which the propeller is mounted is indicated at 15, the hub 1' being formed in one integral piece and having a transverse opening therethrough for the reception of the stub shaft. The hub 1' is provided on its front side with an extension sleeve 16 having a seat 17 for the reception of the base of the motor 9 and the electric motor 9 is slid into this seat and firmly secured in position by bolts in any suitable manner. The sleeve 16 is provided with openings 16' for accommodating tools for engaging the openings 18 in the screw-threaded nut 19 on the end of the stub shaft 15. On its other side the hub 1' is provided with an extension sleeve 20 carrying the slip or collecting rings 21 for supplying power to the motor 9 and reversing the same. In the particular embodiment shown the propeller is a two bladed propeller and accordingly the hub 1' has two oppositely disposed sockets for the reception of the shanks 4 of the variable pitch blades 2. Each of the two sockets is provided with three bearing supports or seats and bearings for the shank, an outer bearing ring support 22 carrying a ball or roller bearing unit 23, the latter being inserted from the open end of the socket and retained in operative position by means of a holding ring or annular plate 24 secured to the end of the socket; an inner roller bearing unit 25 for the extreme inner end of the shank 4, the hub being provided with a seat for receiving this bearing unit; intermediate the two units 23 and 25 there is disposed a thrust roller bearing 26 for taking up the centrifugal force of the propeller blades and each of the sockets is provided with an integral inner annular flange 27 for retaining this thrust ball bearing unit 26 in its operative position, the unit 26 being contained in a cylindrical bore of the socket. A securing and assembling nut 28 is provided for the end of the shank 4 and this nut is screwed on against the inner side of the bearing unit 26, the latter being retained between this nut and the flange 27. The hub is formed with a pair of openings 30 disposed on the opposite sides of the axis of the rotation of the propeller unit, each such opening, as hereinafter described, being disposed on the same side of the hub as the "trailing edge" of the propeller blade. These openings of the embodiment indicated are of rectangular or other convenient form and are large enough to receive the bearing unit 25 and the nut 28, the openings being large enough on the diagonal to receive the thrust bearing parts 26. Diametrically opposite from an opening 30 I have formed the hub with another opening 31 of relatively smaller dimensions than the opening 30 (in the particular embodiment shown the openings 31 are approximately two-thirds the size of openings 30). This has the effect of equalizing the bending moments produced by the centrifugal force and the torque of the driving engine and in lessening the weight. In general when the rotation is in the direction of the arrow C, the latter being parallel to the plane of rotation of the propeller blade and above the axis of rotation, the larger or wider opening 30 should be on the right side of the line X—X, namely, on the same side of the hub as the trailing edge of the propeller blade, while the smaller opening 31 should be on the left side of the line X—X, namely, on the same side of the hub as the leading edge of the propeller blade. With this construction the widths of the hub holes or openings 30 and 31 can be so proportioned that the bending moment due to centrifugal force about the neutral axis NA of the section can be made to approximately equalize the bending moment resulting from the engine torque and this results in a further lightening of the weight of the propeller since it is thus possible to use thinner walls than could otherwise be done.

In the case of the sectional view of Fig. 9, the opening 6' is provided, (in the outer part of the hub) for accommodating the annular plate of the arm 32 carrying the segment 5'. This has the effect of providing a convenient passage, for this arm, and there is also obtained a partial equalization of the bending moment due to the centrifugal force acting about the neutral axis, and the bending moment due to the aerodynamic thrust load acting on the propeller blade and acting also about the neutral axis of this hub section, but in the opposite sense or direction. The saving of weight, caused by this opening, is mostly an indirect one, caused by the more compact, general, design thus obtainable.

Where the stress calculations permit the same to be used, a hole or slot, 33, may also be used, on the opposite side from the main opening, resulting in a further reduction of weight, but this may, or may not be omitted, according to the special requirements imposed, in any certain case.

In the embodiment shown in Figs. 6 and 9, the shaft of motor 9 is provided with a worm gear 35 on either end thereof which meshes with the worm gear 36 carried by a counter shaft 37, the latter at its other end carrying a worm 38 which meshes with the worm wheel 39 on the shaft 7', which carries the worm 7, the shaft 37 being parallel with shanks 4 of the blades and the whole being symmetrically arranged with the motor 9 extending across the axis of the stub shaft 15. I have indicated at 40 the standard for supporting the main worm spindle.

The assembly of the hub and propeller blades may be very easily effected. The bearing units 25 and 26 and the nuts 28 are inserted through the openings 30 and held in proper alignment while the shanks 4 of the blade are threaded therethrough, the blades being screwed into the nut. By means of this construction wherein the forces of the propeller are partially or wholly balanced or offset by one another the weight of the propeller is kept within practical limits notwithstanding the pitch adjusting mechanism while the whole unit is characterized by its compactness, its simplicity in design and the facility with which it may be assembled.

I claim:

1. An air propeller having a central hub structure with sockets for the reception of separable blades, said hub structure having parts of its socket walls removed, the parts removed being in the form of openings longitudinally displaced and disposed on opposite sides of the bearing line of the hub and the blades leaving an uninterrupted circular wall section at said bearing line.

2. An aircraft propeller having its blades journaled for variations in pitch in spaced bearings disposed within the propeller hub structure one a thrust bearing and having an electric motor unit mounted symmetrically across the outer end of the drive shaft and against the face of the hub, said hub structure having openings formed on one side thereof between the spaced bearings and reduction gearing between the electric motor and the variable pitch propeller blades including gears disposed in said openings.

3. An aircraft propeller having its blades journaled for variation in pitch within the propeller hub structure and having a blade adjusting mechanism including a motor for actuating the same, mounted symmetrically across the outer end of the drive shaft, said hub structure having openings formed on the side thereof and gearing between the motor and the variable pitch propeller blades including gearing connections disposed in the openings.

4. An aircraft propeller having its blades journaled for variation in pitch within the propeller hub structure, the latter having mounted on one side thereof and upon the propeller axis a motor adjusting unit and having openings formed therein on the opposite sides of the motor and a gearing system between the motor and the variable pitch blades including gearing connections passing through said openings, each blade being journaled in spaced bearings disposed on opposite sides of the opening for the accommodation of the gearing connections.

5. An aircraft propeller having its blades journaled for variation in pitch within the propeller hub structure, the latter having mounted on one side thereof and upon the propeller axis a motor adjusting unit and having openings formed therein on the opposite sides of the motor and a gearing system between the motor and the variable pitch blades including gearing connections passing through said openings, the propeller hub structure being provided with openings angularly and longitudinally displaced from the first named openings.

6. An aircraft propeller having its blades journaled for variation in pitch within the propeller hub structure, the latter having mounted on one side thereof and upon the propeller axis a motor adjusting unit and having openings formed therein on the opposite sides of the motor and a gearing system between the motor and the variable pitch blades including gearing connections passing through said openings, the hub being formed with socket portions within which the variable pitch blades are journaled and said sockets are formed with openings on the trailing sides thereof.

7. An aircraft propeller having its blades journaled for variation in pitch within the propeller hub structure, the latter having mounted on one side thereof and upon the propeller axis a motor adjusting unit and having openings formed therein on the opposite sides of the motor and a gearing system between the motor and the variable pitch blades including gearing connections passing through said openings, the hub being formed with socket portions within which the variable pitch blades are journaled, said sockets being formed with openings on the trailing sides thereof and also with openings on the leading sides.

8. An aircraft propeller having its blades journaled for variation in pitch within the propeller hub structure, the latter having mounted on one side thereof and upon the propeller axis a motor adjusting unit and having openings formed therein on the opposite sides of the motor and a gearing system between the motor and the variable pitch blades including gearing connections passing through said openings, the hub being formed with socket portions within which the variable pitch blades are journaled, said sockets being formed with openings on the trailing sides thereof also with openings on the leading sides, said openings on the trailing and leading sides being angularly displaced from the first named openings.

9. A variable pitch propeller having an integrally formed one-piece hub structure, the latter having sockets for the reception of the variable pitch blades and the accommodation of bearings for the blade shanks, said sockets having openings on the trailing side for the purpose set forth.

10. A propeller of the character set forth in claim 9 wherein smaller openings are provided on the leading sides of the sockets for the purpose set forth.

11. A variable pitch propeller for aircraft and the like including a hub having sockets and bearings therein for the reception of the blade shanks, gears on said shanks for rotation of the blades, an electric motor unit rigidly mounted symmetrically about the propeller drive shaft axis and displaced in the direction of the shaft axis from the central plane of rotation of the propeller blades and a system of reduction gearing between said motor and said shank gears which is wholly disposed forward of said plane of rotation.

In testimony whereof I have signed my name to this specification.

WALLACE R. TURNBULL.